United States Patent [19]
Ku

[11] 3,961,496
[45] June 8, 1976

[54] PORTABLE AIR CONDITIONER

[76] Inventor: Paul H. Y. Ku, 47-50 - 59th St., Woodside, N.Y. 11377

[22] Filed: Oct. 30, 1975

[21] Appl. No.: 627,197

[52] U.S. Cl. .................................. 62/459; 62/244; 62/464; 62/332
[51] Int. Cl.[2] ........................ F25D 3/02; B60H 3/04; F25B 25/00
[58] Field of Search ............ 62/420, 463, 464, 244, 62/421, 459, 424, 460, 332, 425, 422, 423

[56] References Cited
UNITED STATES PATENTS

| | | | |
|---|---|---|---|
| 2,371,129 | 3/1945 | Crouch | 62/464 |
| 2,437,332 | 3/1948 | Newton | 62/332 |
| 2,469,259 | 5/1949 | Burgess | 62/244 |
| 2,766,598 | 10/1956 | Amiot | 62/459 |
| 2,780,073 | 2/1957 | Curry | 62/244 |
| 2,802,347 | 8/1957 | Marcui | 62/459 |
| 3,443,396 | 5/1969 | Ziolkowski et al. | 62/459 |

*Primary Examiner*—Lloyd L. King

[57] ABSTRACT

In a preferred embodiment, a mateable upper and lower vessel having upper and lower compartments substantially isolated from one-another, of insulation light-weight material self-supporting, containable of water and ice in the lower compartment and having mounted fans adjacent upper ports of the upper compartment and therebeneath water-circulation conduits and heat-transfer fins with a connected pump mounted also within the upper compartment and circulatable of water from the lower compartment through the water-circulation conduits and heat-transfer fins which are located above air intake ports at a lower location within side walls of the upper compartment structure, with separate variable controls of speed for the separate fans, and with thermostat and manual activation switches in parallel with one-another both in electrical series with a variable speed control of the motor of the pump.

10 Claims, 3 Drawing Figures

PORTABLE AIR CONDITIONER

This invention relates to a portable air conditioner for typically an automobile.

BACKGROUND TO THE INVENTION

Prior to the present invention, there have been various inventions patented which are adapted for the use of ice in order to by-pass the normal refrigeration cooling equipment a part of typical air conditioners, but such have been large and bulky and far from efficient, and rarely of a size that might be considered truly portable in nature. One portable unit is found in U.S. Pat. No. 2,170,993, in which air conduits are passed through cooled water in which refrigeration coils or ice are located to cool the water which cools the coils and air within them which is pumped directly to the exterior area to be air-conditioned. Although not of a size and purpose to be portable, the air conditioner of U.S. Pat. No. 2,469,259 segregates ice from water circulated through an air-circulation space traveling (extending) horizontally, the water conduits extending vertically across the path of horizontal flow of air to be cooled. Then there is the U.S. Pat. No. 1,943,127 which discloses a unit alleged to be portable, of a diverse mechanism, and which as a matter of fact requires a large wagon to carry the same and could hardly be considered portable in the conventional sense of the word.

A matter not readily apparent from a study of the patents above-noted is the factual lack of cooling efficiency as has been experimentally determined by the present inventor in the constructing of analagous systems, in the arriving at the present invention, such being most critical in view of the need to extend the effective life of any quantity of ice that may be utilized for a predetermined period of cooling during an automobile trip, for example. The greater the cooling efficiency, and the less wasted cooling and avoidance of over-cooling, the longer the life of the ice utilized to effect the cooling.

SUMMARY OF THE INVENTION

Accordingly, objects of the present invention include the avoiding of the difficulties and problems of prior air conditioners contemplated to be portable, and overcoming those and other difficulties, while obtaining novel advantages not heretofore available.

In particular, it is desired to obtain maximum cooling of each portion of circulated air in so far as efficiency of cooling potential is concerned.

Also, an object is to have manageable control over the rate of circulation of coolant through heat-exchange apparatus, so as not to extract excessive heat above the requirement of any particular moment of air conditioning.

Another object is to adapt the rate of air circulation to the extent of flow needed for a particular volume of space to be cooled within an automobile or other room space as the case may be.

Another object is to obtain optionally alternate manual and automatic thermostatic control of air circulation, for improved adaptablility as is clearly advantageous for a portable unit subject to a variety of changing conditions and spaces to be air conditioned by such a portable unit.

Another object is to make available an easily disassembly possibility for the replenishing of cooling ice, as well as to provide a convenient means for drainage of excessive amounts of water and/or substantially all water therefrom when completing a temporary use thereof and in the act of cleaning the same.

Another object is to make available easy access to the inner-working parts for replacement or repair of parts as might be required from time to time.

And a particular and main object, as would be apparent from the prior discussion, is to obtain a small efficient and light-weight unit of a size and shape suitable for use within a small space such as an automobile or the like.

Other objects become apparent from the preceding and following disclosure.

One or more objects are obtained by the invention as defined herein.

Broadly the invention may be defined as container for water and ice made of heat insulation material of light weight such as self-supporting foam preferably, but of any light-weight refrigerator cabinet structure as might be desired or conventional, capable of support of air conditioning motors, pumps and fans of small dimensions preferably in an upper separate lid-half of the container within an upper space preferably (but could be mounted on an exterior), with a segregating partition substantially separating the upper inner space from the lower vessel space containable of the water and ice, with air intake ports being in lower portions of the upper lid-half typically in side walls thereof, and at least and preferably two fans mounted spaced apart from one-another beneath respective exhaust ports preferably in the upper face of the lid-half of the container, and with the pump and its cooling conduits and channeled-fins located within the void space between the intake ports and the fans, beneath the fans substantially, such that the cooled water is pumped through the conduits and fins which in turn cool the hot air taken-in through the lower intake ports and exhausted through the upper exhaust ports, the heated water being returned through the conduits to the lower half containing the ice and water. Preferably the separate fans have separate speed controls in order that two features may be obtained, namely, to gain most even or equilized circulation through the space for the circulating air as to obtain equal temperatures of coolant air leaving all exhaust ports, it being possible that some air being taken-in will become more readily cooled when near the circulating water-coils first arising from the lower compartment, as contrasted to intake ports adjacent coils returning warmed water to the lower compartment from the upper compartment; and secondly, each structure and fan and cooling conduits and fins are different from each other apparently identical unit, this being the nature of mechanical and electrical gadgets, whereby by having variable control over the separate fans, even air conditioning will be obtained from each and every port, this in turn making for greater convenience and comfort in all areas being cooled, avoiding warm areas of an automobile passenger space as compared to other areas thereof that might be too cool for passengers. Simultaneous with obtaining better control and greater satisfaction in air-conditioning passengers, excess and wastful cooling is not obtained in some areas which would otherwise shorten the life-span of the ice being utilized in the lower compartment. While not specifically illustrated, it is contemplated that the power source for the air conditioner will be typically a cigarette lighter plug of an automobile. In conjunction with the above features, the heat exchange structure over which the intake air is circulated, is preferably of a channelled-fin type with a series of parallel fins arranged typically and preferably substantially vertically for passage of the intake air upwardly therebetween and around, for the cooling of the rising hot air while cooled air has a natural tendency to drop because of higher specific gravity thereof, with the result of additional heat-exchange between cooled air and rising hot air, mixing and heat-exchange of heat to cool air and/or structure of the fins and other coils thus being enhanced by virtue of the exhaust ports being located in an upper lid-face location in conjunction with the intake ports being at a lower location, together with the exhaust fan being adjacent the exhaust port so as to obtain adequate exhaust of air conditioning air from the upper compartment into the space to be air conditioned, while such location of the fans permits the above-noted intermixing by virtue of sinking cool air and rising hot air within the compartment, in conjunction with the circulating effect of the exhaust fans. Such novel features have not been heretofore obtainable. The preferred fins to some extent channel each of cool and hot air, thereby avoiding all cool air from becoming channelled within possibly one or two localized areas while hot air might otherwise become channeled in other one or two localized areas, such serving to defeat efficient heat-exchange. It should be noted that the highly efficient heat-exchange and cooling of this novel air conditioner makes possible minimal use of the air conditioner, which in turn not only preserves the ice for a long period of use, but additionally avoids excessively long and frequent periods of use of the automobile battery, thus avoiding excessive discharging pull on the battery of the automobile. In like manner, both electrical power and excessive melting of reserve ice are avoided by the advantageous variable speed control of the water pump motor and pump associated therewith, in the circulation of cool water from the lower compartment cyclically in the closed-circuit conduits and fins of the upper compartment and return of the warmed water to the space of the lower compartment. To gain further control of the water circulation, preferably there are in parallel electrically, a thermostat and an over-ride manual by-pass for alternate manual activation of the power lead to the variable control switch and pump motor controlled thereby. The pump motor is typically a twelve volt pump motor with appropriate pump associated therewith, since such is easily driven by the automobile battery, and likewise the fan motors are maintained at minimal size to similarly avoid excessive drainage of the automobile battery, while concurrently the plurality of fans achieves the exceptionally good and effective circulation and cooling efficiency, such having been verified thoroughly by experimentation by the inventor. In addition, there is a preferred master-control off-on switch to both fan and pump motors, for making and breaking circuit electrically thereto, aside from an alternate mere plugging and unplugging from an automobile cigarette lighter. Additionally, for the upper lid-half of the container structure, the upper half has appropriate structure for aligning and seating the upper half upon the lower half, and latching thereto, of a male-female meshing meshing arrangement preferably, and even more preferably the upper lip of the sides of the lower half upright walls being stepped to receive stepped lower edge lip structure of the upright walls of the lower portion of the upper half. Preferably, the partition between the upper compartment and the lower compartment is also seatable on the upper surface of a step of the lower half such that upon removal of the normally latched upper half, the horizontal partition may be lifted simply by a convenient handle (or possibly finger-holes), for the ready access to the ice and water lower compartment space.

THE FIGURES

DETAILED DESCRIPTION

Figure 1:
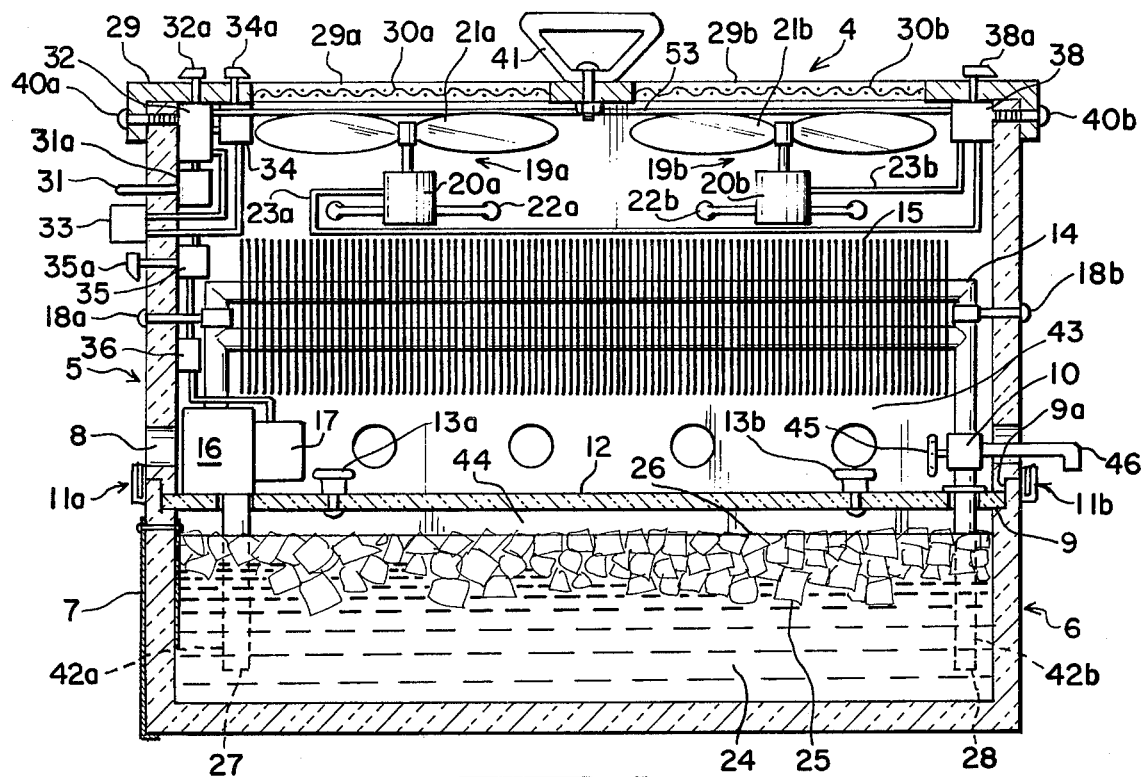
FIG. 1 illustrates in side cross-sectional view through the container vessel, and in diagrammatic elevation plan view of the mounted elements therewithin, a preferred embodiment of the air conditioner of this invention.
Figure 2:
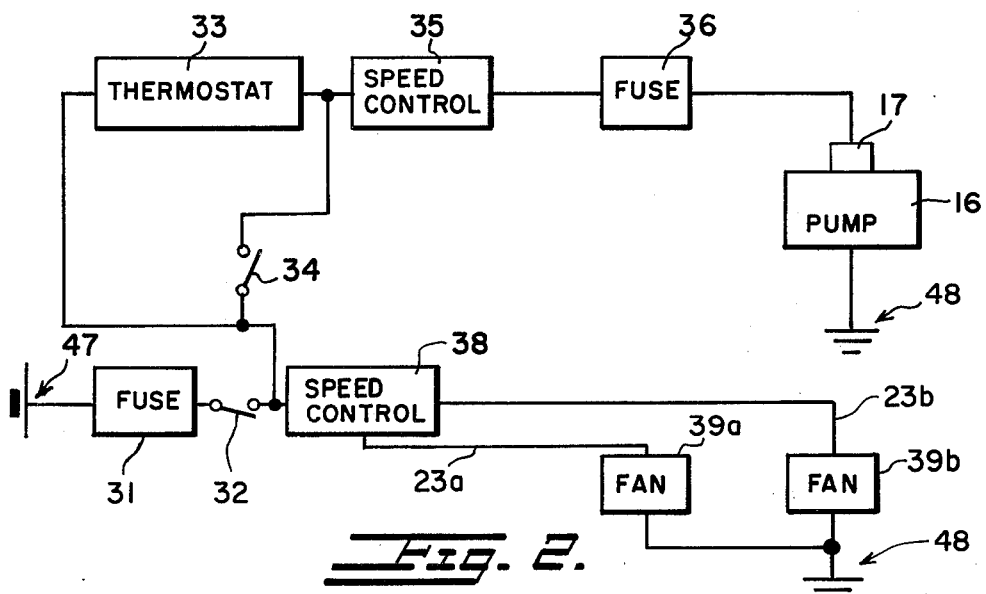
FIG. 2 illustrates diagrammatically the circuitry of the embodiment of FIG. 1.
Figure 3:
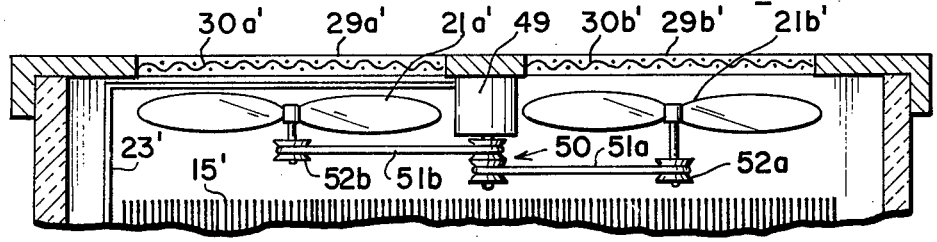
FIG. 3 illustrates a view the same as in FIG. 1, of an alternate embodiment having a plurality of fans driven commonly by a single motor, other elements of the mechanism not being shown but otherwise typically the same as in FIG. 1 except for location of controls.

FIG. 1 and FIG. 2 correspond to a common preferred embodiment of the invention, and accordingly designation numerals are the same in these two figures. The FIG. 1 container 4 has an upper half (portion) 5 and a lower portion 6. Mounted on the lower portion 6 is a ground lead grounding liquid and metal elements inserted into the liquid such as pump intake conduit 42a and pump and circulation conduits output conduit 42b. Hot air intake ports 8 are located in the lower side walls of the upper portion 5. Each of the meshing edges of the upper and lower portions are stepped, with the lower portion 6 having horizontal step portion 9 onto which rests partition 12 extending horizontally and segregating upper space 43 from lower space 44, and the inner lower lip of the step of the upper portion 5 being meshed retainably within and against the upright surface 9a, the lower lip of the upper portion 5 resting on top of and pinning down the partition 12. Valve 10 with its valve handle 45 and drain outlet make possible diversion of returning liquid to an exterior of the vessel, typically for the draining thereof. Releasably lockable latches 11a and 11b latch together the upper portion 5 and the lower portion 6. After removal of the upper portion 5 after unlatching latches 11a and 11b, by lifting on handle 41, the partition may be lifted by grasping either or both handles 13a and 13b and lifting, whereupon water may be easily added, as well as ice may be added; optionally, ice may be alone placed therein, and later water may be in that manner added or the water may be added through the valve 10 by the conduit 46, and through conduit 42b. Water 24 cooled by the ice 25, having a representative water level 26, is pumped upwardly into conduit 42a by pump 16 driven by electric motor 17, into the conduit pipes 14 and channelled fins 15, thereafter returning by the conduit 42b to the space 44. The conduits 42a and pump 16 and motor 17, and the conduit pipes 14 and fins 15 are commonly supported by the clamps 18a and 18b, as well as by the pump 16 resting upon the partition 12. The fans 19a and 19b include the fan motors 20a and 20b and the blades and shafts, as 21a and 21b, with the motors 20a and 20b being supported on typically the wall structure of the upper portion by support structures 22a and 22b. Electrical power leads 23a and 23b furnish electrical power to the respective fan motors. Intake water conduit 42a has intake port 27 and output water conduit 42b has output conduit 28. Upper face structure 29 of the upper portion 5, has respective output ports 29a and 29b for cooled air exhaust from space 43 through wire mesh (or other appropriate mesh) 30a and 30b after the air travels between and/or around the water conduit pipes 14 and fins 15.

Power is fed to the system through the electrical contact 31 into the fuse 31a, to the master control off-on switch 32 having the manual control lever 32a, and the electrical power from the switch 32 goes to each of the thermostat 33 mounted on the outside side wall of the upper portion 5, and to the by-pass switch 34 with its manual control lever 34a; output leads from the thermostat and from the switch 34 join and lead to the speed control switch 35 having manual control lever 35a, and from switch/control 35 the electrical power is fed through fuse 36 to the motor of the pump, namely motor 37a of pump 37b. Power from the master control switch 32 is also fed to the speed control switch 38 having manual control lever 38a, with separately controlled output leads 23a and 23b respectively to fan motors 39a and 39b, and thereafter to ground.

WORKING EXAMPLES

Utilizing a working embodiment, having a 12 volt pump motor and pump associated therewith, and two separate fan motors and fans thereof, the draw on the battery was 14.5 amps, 4 amps each from the fan motors, totaling 8, and 6½ amps from the pump motor, totaling 14.5 amps. The dimensions of the ice-containing space was 16.5 inches by 13 inches by 16 inches, giving a volume of 1.98 cubic feet, into which space was placed 60 pounds of ice having a volume of about 1 cubic foot, and a minor amount of water was added thereto for providing water for circulation. The intake air was in a first experiment at 95°F, and the water was pumped into the conduit pipes at a temperature of 32°F at a rate of 2.5 gallons per minute, each gallon weighing 8.33 pounds per gallon, which represented 20.8 pounds per minute for 60 minutes, thus totaling at 1249.5 pounds of water pumped per hour. The air conditioner thus delivered at a rate of 5,857 BTU per hour, this being sufficient to cool an automobile within about a minute. Devoid of the ice and water, the unit weighs about 28 pounds. The thermostat was set to begin pumping when the temperature was 76°F or more, and to stop pumping when the temperature was 72°F or less. BTU per minute was 97.6.

When intake air was 90°F, the return water was at 36.4°F, whereby the output in cooling was 82.8 BTU per minute.

When intake air was 85°F, the cooling was at 69.2 BTU per minute.

It should be noted that on the above basis of cooling, the 60 pounds of ice has a cooling capacity potential of about 6000 BTU, which will keep a car in a comfortably cool condition all day long, it being noted that once the air is cooled, maintaining that temperature does not require as great a rate of cooling nor require continuous cooling.

It is within the scope of the invention to make changes and modifications and substitution of equivalents as would be obvious to a person of ordinary skill.

I claim:

1. A portable air conditioning device comprising in combination: container means for retaining water and for providing insulation against heat transfer through walls thereof and for providing support structure for elements mounted thereon; said support structure including a dividing partition substantially dividing interior space of the container means into an ice compartment and a heat-transfer compartment, said ice compartment and said heat-transfer compartment being substantially segregated from one-another; pump and motor means for pumping water in closed cycle from said ice compartment through said heat-transfer compartment and back to said ice compartment; heat-transfer means for circulating warm air in heat-exchange relationship with cool water when circulated in said closed cycle, within said heat-transfer compartment, and for intaking said warm air from and exterior source and for evacuating cooled air from the heat-transfer compartment to an exterior location to be cooled; said heat-transfer means including fans located above said closed cycle, the container means having intake ports within lower portions of walls of said heat-transfer compartment and having exhaust ports within upper portions of walls of said heat-transfer compartment and the heat-transfer means further including water-circulation conduits cycling water from and to the ice compartment, and said water-circulation conduits being mounted substantially above a level of said intake ports.

2. A portable air conditioning device of claim 1, in which said heat-transfer means includes separate activation circuits and variable speed controls, for respective separate ones of said fans.

3. A portable air conditioning device of claim 2, in which said water-circulation conduits include a plurality of substantially parallel water-circulation cooling fins adapted for circulation of hot air derived from said intake port therebetween in heat-exchange relationship therewith and for circulation of cooled air therefrom to and through said exhaust ports.

4. A portable air conditioning device of claim 3, in which said pump and motor means includes a variable speed control.

5. A portable air conditioning device of claim 4, in which said pump and motor means includes parallel electrical activation leads connected to alternately provide power to said variable speed control, a thermostat being in series within one of the electrical activation leads and a manual-activation switch being in series within the other of the electrical activation leads, adapted such that normal pump activation is controlled by said thermostat but such that the pump may be activated by by-passing the thermostat when desired.

6. A portable air conditioning device of claim 5, in which said electrical activation leads are connected each in series with an off-on switch adapted to turn on and off alternately all electrical power from a connected power source.

7. A portable air conditioning device of claim 6, in which said separate activation circuits and speed controls are in series electrically with said off-on switch, in parallel with said thermostat and said manual-activation switch.

8. A portable air conditioning device of claim 7, in which said container means includes an upper structure defining the heat-transfer compartment, and a lower structure defining the ice compartment, the upper and lower structures including mateable male and female structures adapted such that the upper structure is seatable on top of the lower structure, detachably including a releasable latching-on means for holding-together the upper and lower structures.

9. A portable air conditioning device of claim 1, in which said container means includes an upper structure defining the heat-transfer compartment, and a lower structure defining the ice compartment, the upper and lower structures including mateable male and female structures adapted such that the upper structure is seatable on top of the lower structure, detachably including a releasable latching-on means for holding-together the upper and lower structures.

10. A portable air conditioning device of claim 9, in which said heat-transfer means includes separate activation circuits and speed controls, for respective separate ones of said fans, in which said pump and motor means includes a variable speed control, in which said pump and motor means includes parallel electrical activation leads connected to alternately provide power to said variable speed control, a thermostat being in series within one of the electrical activation leads and a manual-activation switch being in series within the other of the electrical activation leads, adapted such that normal pump activation is controlled by said thermostat but such that the pump may be activated by by-passing the thermostat when desired, in which said electrical activation leads are connected each in series with an off-on switch adapted to turn on and off alternately all electrical power from a connected power source, and in which said separate activation circuits and speed controls of the heat-transfer means, are in parallel electrically with said thermostat and said manual-activation switch which are collectively in electrical series with an off-on switch adapted to turn on and off alternately all electrical power from a connected power source.

* * * * *